US00RE44375E

(19) United States
(12) Reissued Patent
Park et al.

(10) Patent Number: US RE44,375 E
(45) Date of Reissued Patent: Jul. 16, 2013

(54) OPTICAL TRANSCEIVER MODULE

(75) Inventors: Jeong Woo Park, Daejeon (KR); Hyun Sung Ko, Daejeon (KR); Yong Soon Baek, Daejeon (KR)

(73) Assignee: Electronics and Telecommunications Research Institute, Daejeon (KR)

(21) Appl. No.: 12/779,446

(22) Filed: May 13, 2010

Related U.S. Patent Documents

Reissue of:
(64) Patent No.: 7,373,032
Issued: May 13, 2008
Appl. No.: 11/450,575
Filed: Jun. 9, 2006

(30) Foreign Application Priority Data

Dec. 10, 2005 (KR) ..... 10-2005-0121240

(51) Int. Cl.
*G02B 6/36* (2006.01)
*H01L 29/22* (2006.01)

(52) U.S. Cl.
USPC ..... 385/14; 385/89; 257/98

(58) Field of Classification Search
None
See application file for complete search history.

(56) References Cited

U.S. PATENT DOCUMENTS 5,867,622 A 2/1999 Miyasaka et al.
5,997,358 A * 12/1999 Adriaenssens et al. ..... 439/676
6,052,038 A * 4/2000 Savicki ..... 333/12
6,148,015 A * 11/2000 Jacquet et al. ..... 372/50.21
6,603,782 B2 * 8/2003 Nakanishi et al. ..... 372/36
7,046,868 B2 5/2006 Terashima
2003/0043527 A1 * 3/2003 Le Creff et al. ..... 361/119
2003/0099017 A1 * 5/2003 Heineke et al. ..... 359/152
2005/0053380 A1 * 3/2005 Kim et al. ..... 398/139

FOREIGN PATENT DOCUMENTS

KR 1020010037485 5/2001
KR 1020030018024 3/2003
KR 1020050045466 5/2005

OTHER PUBLICATIONS

'Record sensitivity, in full-duplex operation at 155 Mbit/s, of a BRS/ridge in-line transmit receive device' Mallecot et al., OFC '98 Technical Digest, Thursday Afternoon, pp. 350-351.

* cited by examiner

*Primary Examiner* — Tina Wong
(74) *Attorney, Agent, or Firm* — NSIP Law

(57) ABSTRACT

Provided is an optical transceiver module of an optical transceiver, which is used for optical communications. The optical transceiver module prevents electrical crosstalk between a light source and a light receiver. Additionally, the optical transceiver module includes an optical transceiver unit including a light source and a light receiver together integrated into a substrate, a circuit unit including a drive circuit driving the light source and a detect circuit reading a signal of the light receiver, and a crosstalk prevention unit connected between the substrate and ground to prevent electrical crosstalk between the light source and the light receiver.

26 Claims, 3 Drawing Sheets

OPTICAL TRANSCEIVER MODULE

Matter enclosed in heavy brackets [ ] appears in the original patent but forms no part of this reissue specification; matter printed in italics indicates the additions made by reissue.

CROSS-REFERENCE TO RELATED PATENT APPLICATION

[This application] *The present patent application is a Reissue of U.S. Pat. No. 7,373,032, issued on May 13, 2008, which* claims the benefit of Korean Patent Application No. 10-2005-0121240, filed on Dec. 10, 2005, in the Korean Intellectual Property Office, the [disclosure] *disclosures* of which [is] *are* incorporated herein in [its] *their* entirety by reference.

BACKGROUND OF THE INVENTION

1. Field of the Invention

The present invention relates to optical communications, and more particularly, to an optical transceiver module for optical communications.

2. Description of the Related Art

An optical transceiver includes a light source, a light source driver, a light receiver, a light filter, a preamplifier, etc. The optical transceiver is usually formed by hybrid integration of these parts. Thus, many attempts have been made to integrate the light source, the light filter, and the light receiver on a single substrate. Additionally, many attempts have been made to integrate only the light source and the light receiver on a single substrate. When the parts are integrated on a single substrate, a package cost can be reduced due to simple packaging. In the optical transceiver module, the package cost is more than half of the total cost of the parts. Thus, it is necessary and important to reduce the package cost by using single-integrated optical devices.

Accordingly, many attempts have been made to form the light source and the light receiver on a single substrate.

FIG. 1 is a schematic view illustrating an optical transceiver unit in which a laser diode (LD) and a photo-detector (PD) are integrated in an in-line manner into a single substrate. That is, the optical transceiver unit is a device in which a light source and a light receiver are integrated into the single substrate in an in-line manner. A portion L indicates a light source portion corresponding to the LD. A portion D indicates a light receiver portion corresponding to the PD. On the other hand, a portion A indicates an absorber between the LD and the PD, which prevents light emitted from the LD from being delivered to the PD. Waveguides or active layers 1, 2 and 3 in the LD, the absorber, and the PD are formed on the substrate along the same axis. Moreover, input light and output light are delivered through the waveguides 1, 2 and 3.

Feedback is achieved through a diffraction grating G. The diffraction grating G and the active layer 1 supplying a gain make up a distributed feedback (DFB) LD that is used as the light source. Accordingly, the LD outputs an output signal S1. Since an input signal S2 uses a transparent wave with respect to the waveguide 1 of the LD and the waveguide 2 of the absorber, the input signal S2 is not absorbed into the LCD and the absorber, and delivered to the PD. For example, a wavelength of the output signal S1 is 1.3 μm, and a wavelength of the input signal S2 is 1.55 μm. Moreover, the active layer 1 of the LD and the active layer 2 of the absorber have a bandgap wavelength of 1.3 μm, and the active layer 3 of the PD has a bandgap wavelength of 1.55 μm. Accordingly, although the input signal S2 passes through the active layer 1 of the LD and the active layer 2 of the absorber, and then reaches the PD, the output signal S1 cannot reach the PD. Other contents related to the optical transceiver unit are disclosed in OFC98, p. 350.

The single-substrate integrated optical transceiver unit disclosed above has the disadvantage of generating electrical crosstalk.

FIG. 2 illustrates a structure of an optical transceiver module using the optical transceiver unit of FIG. 1, which includes a module structure driving the LD and reading a signal input to the PD in the single-substrate integrated optical transceiver unit. The detail description related to FIG. 2 is disclosed in U.S. Pat. No. 6,148,015.

Referring to FIG. 2, a method of driving the LD is as follows.

An optical current generated in the absorber A, which prevents light emitted from the LD from being absorbed into the PD, is read and delivered to a controller 16. The controller 16 compares the optical current to an appropriate physical quantity (particularly, a voltage V1), and then supplies a direct current (DC) into the LD. The controller 16 is a voltage comparator comparing voltages at both terminals and outputting a comparison result. At this point, the absorber A serves as a monitor PD in a conventional optical transceiver unit, and the method of driving the LD by controlling the DC drive current of the LD using the read current of the monitor PD is one of the conventional methods. An inductor 14 is placed in front of the controller 16, and a capacitor $C_I$ placed in front of an input terminal LI delivers an alternating current (AC) that drives the LD.

Next, a method of reading a signal input to the PD is as follows. The PD is operated by supplying a reverse bias voltage. That is, the reverse bias voltage is applied to the PD by applying a ground voltage to a substrate 10 and applying a negative voltage from a negative power source 19. An inductor 17 in front of the negative power source 19 allows only a DC current to pass through. Meanwhile, a capacitor $C_O$ transmits a detected AC component to an output terminal DO.

In this method, the substrate of the single-substrate integrated optical transceiver unit is set as the ground, a plus bias voltage is applied to the LD, and also a negative bias voltage is applied to the PD. The disadvantage of the method is that the positive AC power applied to the LD is partially delivered to the PD connected to the negative power source 19.

FIG. 3 is a circuit diagram of the optical transceiver module of FIG. 2.

Referring to FIG. 3, a light source L, an absorber A, and a light receiver D are diodes. Here, the light receiver D, which is also a diode, receives a reverse bias voltage. The light receiver D, to which the reverse bias voltage is applied, serves as a capacitor when the AC is supplied. Accordingly, an AC power input to the light source L is partially delivered to a node 1 of a negative voltage through the diode D to which the reverse bias voltage is applied. This phenomenon is called electrical crosstalk that reduces the sensitivity of a receiver drastically.

When noise of −60 to −70 dBm is input to an input terminal of a preamplifier of the light receiver or the receiver, the receiver generates an error. An electrical signal delivered to the light source has a power larger than +10 dBm. Consequently, when more than −70 to −80 dB of a signal applied to the light source is delivered to the receiver, the receiver generates an error. Especially, this problem is more serious in manufacturing an optical transceiver using a single-substrate integrated optical transceiver unit than in hybrid-integration of a light source and a receiver.

SUMMARY OF THE INVENTION

The present invention provides an optical transceiver module preventing electrical crosstalk between a light source and a light receiver by using a single-substrate optical transceiver unit when constituting the module.

According to an aspect of the present invention, there is provided an optical transceiver module including: an optical transceiver unit including a light source and a light receiver together integrated into a substrate; a circuit unit including a drive circuit driving the light source and a detect circuit reading a signal of the light receiver; and a crosstalk prevention unit connected between the substrate and ground to prevent electrical crosstalk between the light source and the light receiver.

The crosstalk prevention unit may include a capacitor and a resistor respectively connected between the substrate and the ground. An AC power delivered to the light receiver may be minimized by delivering an AC current to the ground through the capacitor.

When connecting a resistor between the substrate and the ground, a voltage of the substrate may increase by a DC current applied to the light source, and a reverse bias voltage may be applied to the light receiver even though a negative voltage is not applied to the light receiver. It may be desirable that the capacitor have a capacitance of over 1 pF and most of the AC current flows to the ground.

A capacitor and a transistor respectively may be connected between the substrate and the ground to prevent the electrical crosstalk. An absorber may convert light emitted from the light source into a current, and then a current of the transistor may be controlled with a signal of the converted current. Additionally, the transistor may be used as a current source when the drive circuit of the light source includes a differential pair circuit.

A gate resistor may be disposed between the gate and the ground when the transistor is a MOS transistor, and the gate resistor is unnecessary when the transistor is a bipolar transistor.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
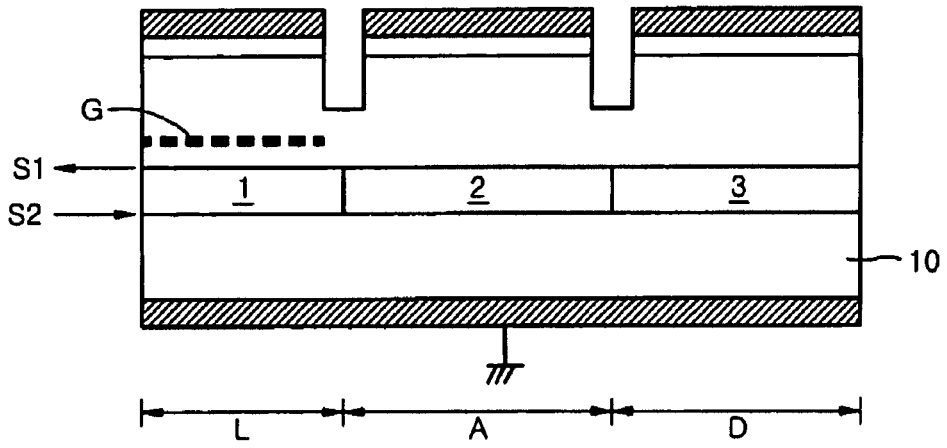
FIG. 1 (PRIOR ART)
FIG. 1 is a schematic view illustrating an optical transceiver unit in which an LD and a PD are integrated in an in-line manner into a single substrate.
Figure 2:
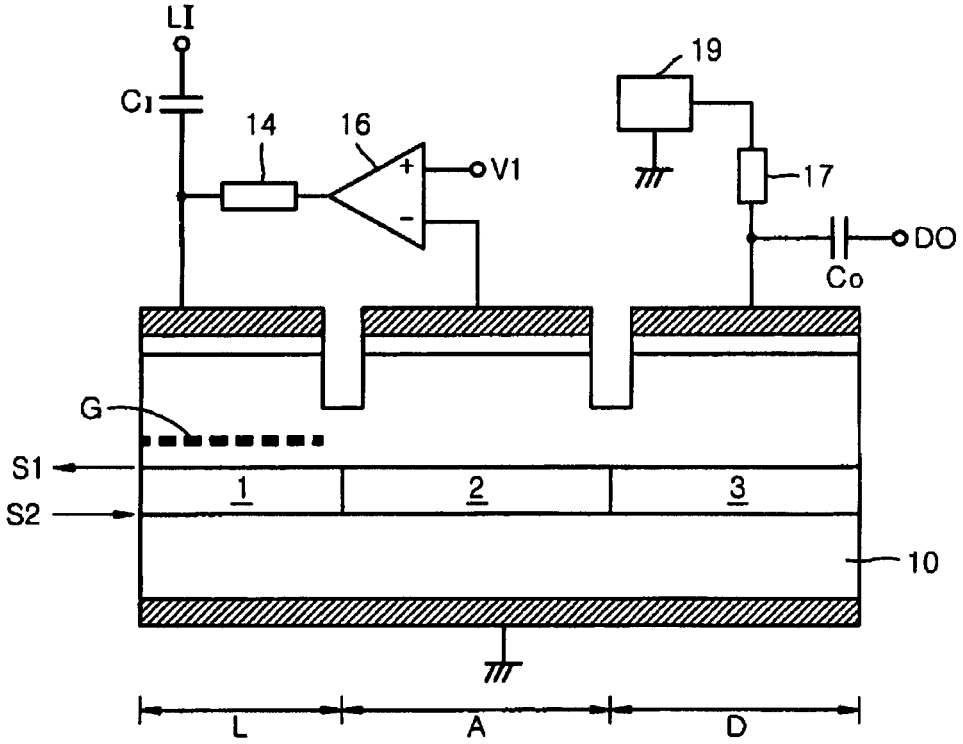
FIG. 2 (PRIOR ART)
FIG. 2 illustrates a structure of an optical transceiver module using the optical transceiver unit of FIG. 1.

The present invention will now be described more fully with reference to the accompanying drawings, in which exemplary embodiments of the invention are shown. The invention may, however, be embodied in many different forms and should not be construed as being limited to the embodiments set forth herein. Rather, these embodiments are provided so that this disclosure will be thorough and complete, and will fully convey the concept of the invention to those skilled in the art. In the drawings, the thicknesses of layers and regions are exaggerated for clarity. To facilitate understanding, identical reference numerals have been used, where possible, to designate identical elements that are common to the figures.

Figure 3:
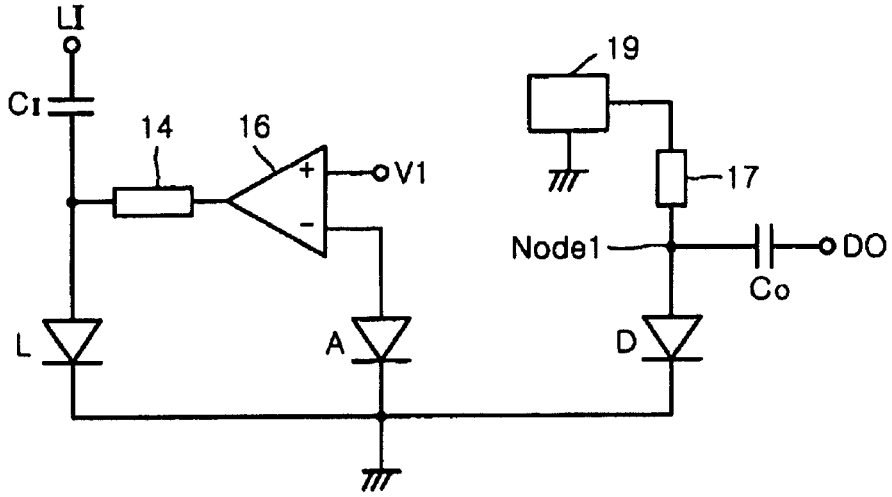
FIG. 3 (PRIOR ART)
FIG. 3 is a circuit diagram of the optical transceiver module of FIG. 2.
Figure 4:
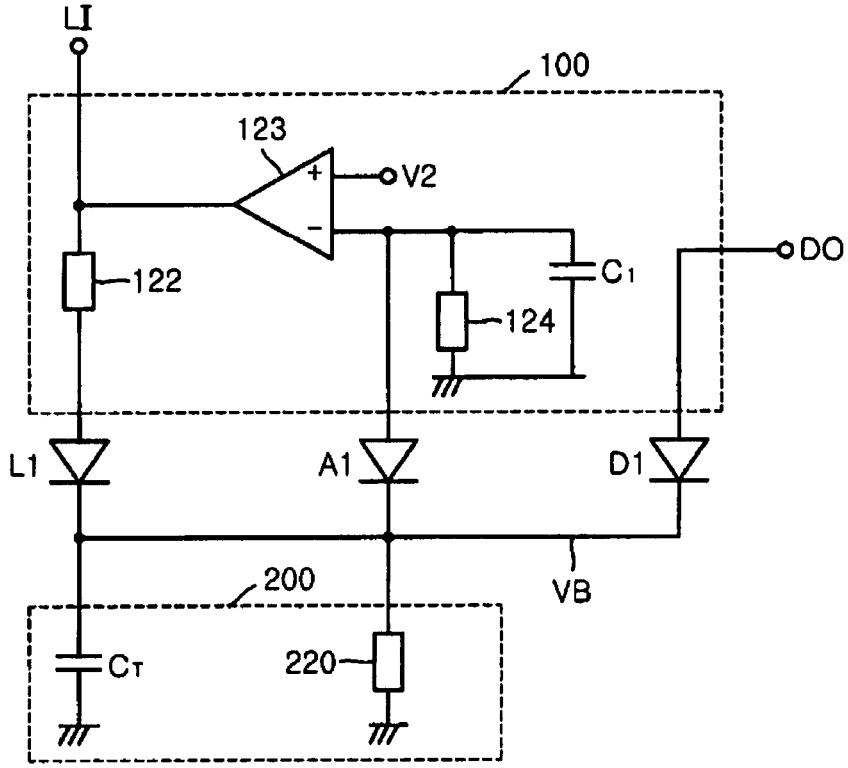
FIG. 4 is a circuit diagram of an optical transceiver module according to an embodiment of the present invention.

FIG. 4 is a circuit diagram of an optical transceiver module according to an embodiment of the present invention. Like in FIG. 3, an optical transceiver unit is a diode.

Referring to FIG. 4, the optical transceiver module includes an optical transceiver unit having a light source L1, an absorber A1, and a light receiver D1 formed on a substrate, a circuit unit 100, and a crosstalk prevention unit 200. Here, the light source L1 is a laser diode (LD), and the light receiver D1 is a photo-detector (PD). However, various kinds of light sources and light receivers can be used.

The crosstalk prevention unit 200 includes a resistor 220 and a crosstalk prevention capacitor CT connected respectively between a substrate and ground. The resistor 220 serves as a current path that directs a direct current (DC), which flows through the light source L1, to the ground. Thus, a positive voltage corresponding to the DC that flows in the resistor 220 is formed in a substrate voltage line VB. The positive voltage, which is formed in the substrate voltage line VB, forms a reverse bias voltage in the absorber A1 and the light receiver D1. Accordingly, it is unnecessary to apply a negative voltage to the light receiver D1. The crosstalk prevention capacitor $C_T$ directs an alternating current (AC), which flows in the light source L1, to the ground. Thus, the AC does not reach an input terminal DO of a preamplifier through the light receiver D1 operating as a capacitor.

At this point, since an effective capacitance of the light receiver D1 is 0.1-several pF, the crosstalk prevention capacitor $C_T$ needs to be sufficiently large, for example, several nF, such that the AC flowing to the light source L1 is directed to the ground through the crosstalk prevention capacitor $C_T$. In this way, an effect that (a portion of) an electrical power inputted into the light source L1 is delivered to the light receiver D1 (i.e., electrical crosstalk) can be reduced.

The circuit unit 100 includes a drive circuit driving a light source and a detection circuit reading a signal of the light receiver D1.

The drive circuit of the circuit unit 100 is connected to the light source L1 and the absorber A1 to control a drive current of the light source L1. The drive circuit includes a controller 123 and an impedance matching resistor 122. The controller 123 is a voltage comparator comparing a voltage, which corresponds to a current flowing in the absorber A1, to a reference voltage V2 and outputting a comparison result. The controller 123 includes a resistor 124 for generating DC control voltage. Also, the controller 123 includes a capacitor C1 for bypassing the AC to ground. The controller capacitor C1 bypasses the AC optical current, which is generated through the absorber A1, to the ground. The impedance matching resistor 122 is used to adjust an effective impedance of the input terminal LI to an appropriate size, for example, 50Ω.

A DC drive current of the light source L1 is adjusted by feedback. That is, when the output intensity of the light source decreases due to an increase of the surrounding temperature or characteristic deterioration of the light source L1, light intensity absorbed in the absorber A1 decreases, and thus a current flowing through the controller resistor 124 decreases. Accordingly, a voltage applied to the controller resistor 124 decreases and thus an output current of the controller 123 increases. Consequently, the DC that flows in the light source L1 increases, and also an output of the light source L1 increases.

Thus, an average output of the light source L1 is controlled through the feedback of the controller 123.

Since the substrate voltage line VB is a positive voltage because of the resistor 220 according to the present invention, the detection circuit of the circuit unit 100 detecting a light receiving signal from the light receiver is simple. That is, unlike in FIG. 3, a negative voltage source is unnecessary and thus an inductor is unnecessary also. The output terminal or a capacitor $C_O$ in front of an input terminal DO of a preamplifier is omitted for clarity.

According to the above embodiment, since the capacitor $C_T$ and the resistor 220 are connected between the substrate voltage line VB and ground, electrical crosstalk can be prevented and a reverse bias voltage can be applied to the light receiver D1.

Figure 5:
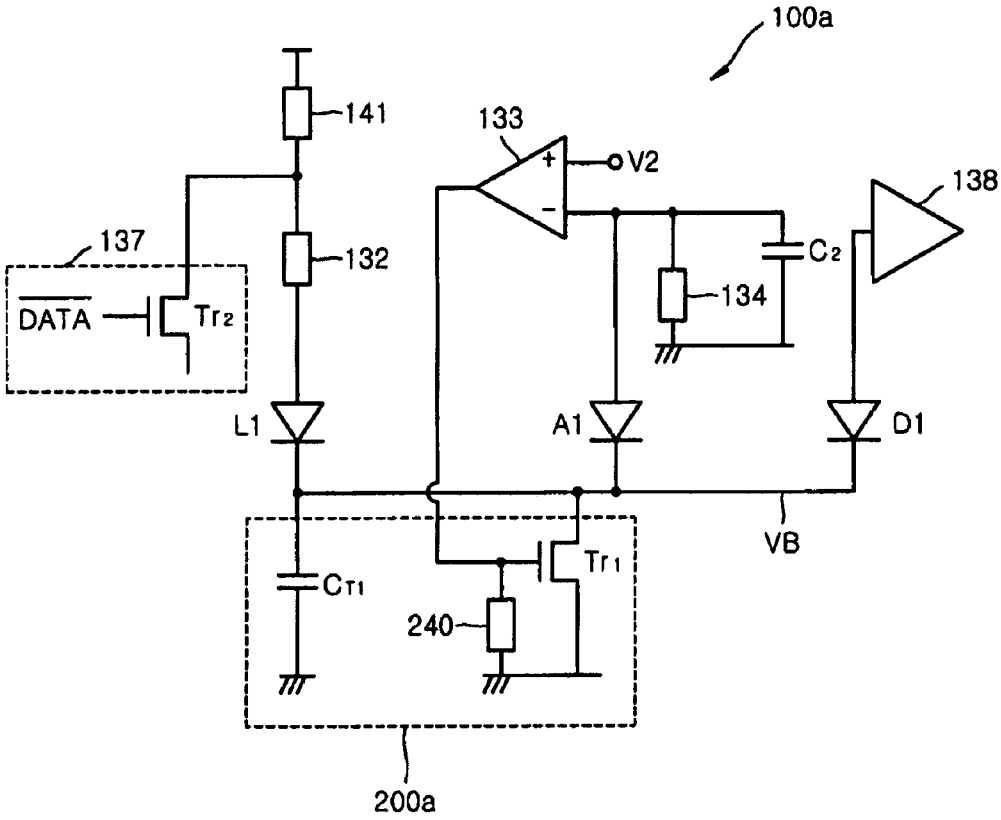
FIG. 5 is a circuit diagram of an optical transceiver module according to another embodiment of the present invention.

FIG. 5 is a circuit diagram of an optical transceiver module according to another embodiment of the present invention. An optical transceiver unit in the optical transceiver module is represented by diodes.

Referring to FIG. 5, the optical transceiver module includes an optical transceiver unit having a light source L1, an absorber A1, and a light receiver D1 formed on a substrate, a circuit unit 100a, and a crosstalk prevention unit 200a. Here, the light source L1 is an LD, and the light receiver D1 is a PD.

Unlike in FIG. 4, the circuit unit 100a further includes a light source driver 137 and a preamplifier 138, and the crosstalk prevention unit 220a includes a transistor Tr1 instead of a resistor 220.

An AC is prevented from being delivered to the light receiver D1 by bypassing it to ground through a crosstalk prevention capacitor $C_{T1}$. In this structure, a DC supplied to the light source L1 is controlled by the transistor Tr1 which receives an output of the controller 133. An average optical current which flows through the absorber flows to the controller resistor 134. A voltage corresponding to the average optical current is applied to the controller 133. Additionally, the controller capacitor C2 serves to bypass the AC optical current.

Since an output of the controller 133 is a current, the current flows to a gate resistor 240 and voltage corresponding to the current is applied to a gate of the transistor Tr1. When the transistor Tr1 is an MOS transistor, the gate resistor 240 is required to generate the input voltage to a gate of the MOS transistor. However, when the transistor Tr1 is a bipolar transistor, the gate resistor 240 is omitted. The transistor Tr1 can be used as a current source of a differential pair circuit including the light source driver 137, i.e., a current source of a light source drive transistor Tr2. Like the resistor 122 of FIG. 4, a resistor 132 in front of the light source L1 is an impedance matching resistor.

A conventional LD driver and trans-impedance preamplifier can be used in the above structure of the optical transceiver module. The preamplifier 138 is located behind the light receiver D1, and the light source driver 137 is connected between an input terminal (not shown) and the impedance matching resistor 132. A complementary signal $\overline{\text{DATA}}$ of DATA is applied to an input of the light source drive transistor Tr2. When DATA is a '0' signal, a current of the light source drive transistor Tr2 is drained since a complementary signal of '0' is '1'. Then, since a current supplied to the light source L1 decreases, and thus an output intensity of the light source L1 decreases, the light signal '0' is outputted. A power source resistor 141 is used to supply a current from a conventional power source.

Using the capacitor $C_{T1}$ and the transistor Tr1, an electrical crosstalk between the light source L1 and the light receiver D1 can be prevented, and a reverse bias voltage can be applied to the light receiver D1.

The optical transceiver module of the present invention can reduce electrical crosstalk between the light source and the light receiver by connecting the capacitor between the substrate and ground.

Additionally, since the reverse bias voltage can be applied to the light receiver by connecting the resistor or the transistor between the substrate and ground, it is unnecessary to apply a negative voltage to the light receiver. Therefore, the optical transceiver module can be simply manufactured.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An optical transceiver module, comprising:

an optical transceiver unit including a light source and a light receiver together integrated into a substrate;

a circuit unit including a drive circuit driving the light source and a detection circuit reading a signal of the light receiver; and a crosstalk prevention unit connected between the light source and the light receiver of the optical transceiver unit integrated in the substrate and ground for preventing electrical crosstalk between the light source and the light receiver.

2. The optical transceiver module of claim 1, wherein the crosstalk prevention unit applies a reverse bias voltage to the light receiver.

3. The optical transceiver module of claim 1, wherein the crosstalk prevention unit is a capacitor.

4. The optical transceiver module of claim 1, wherein the crosstalk prevention unit comprises a capacitor and a resistor respectively connected between the substrate and the ground.

5. The optical transceiver module of claim 4, wherein the circuit unit includes, in association with an absorber, monitoring light emitted from the light source, and a current supplied to the light source is controlled through feedback by the controller.

6. The optical transceiver module of claim 1, wherein the crosstalk prevention unit comprises a capacitor and a transistor respectively connected between the substrate and the ground.

7. The optical transceiver module of claim 6, wherein the circuit unit further includes a controller, in association with an absorber, monitoring light emitted from a light controller, and an on-off state of the transistor is controlled through the controller.

8. The optical transceiver module of claim 6, wherein the transistor is a MOS (metal oxide semiconductor) transistor and a resistor is placed between a gate of the MOS transistor and the ground.

9. The optical transceiver module of claim 6, wherein the drive circuit includes a differential pair circuit driving the light source, and the transistor is used as a current source of the differential pair circuit.

10. The optical transceiver module of claim 3, wherein the capacitor has a capacitance of 1 pF or higher.

11. The optical transceiver module of claim 1, wherein the optical transceiver comprises an absorber between the light source and the light receiver.

12. The optical transceiver module of claim 1, wherein the light source is operated according to a current supply method and the light receiver is operated by a reverse bias voltage.

13. The optical transceiver module of claim 1, wherein [the light source is a laser diode and] the light receiver is a photodetector.

14. The optical transceiver module of claim 1, wherein the substrate is an n-type semiconductor or a p-type semiconductor.

*15. An optical transceiver module, comprising:*

*an optical transceiver unit including a light source and a light receiver together integrated in a substrate; and*

*a crosstalk prevention unit connected between the light source and the light receiver of the optical transceiver unit integrated in the substrate and ground for preventing electrical crosstalk between the light source and the light receiver.*

*16. The optical transceiver module of claim 15, wherein the crosstalk prevention unit applies a reverse bias voltage to the light receiver.*

*17. The optical transceiver module of claim 15, wherein the crosstalk prevention unit comprises a capacitor connected between the substrate and the ground.*

*18. The optical transceiver module of claim 17, wherein the capacitor has a capacitance of 1 pF or higher.*

*19. The optical transceiver module of claim 15, wherein the crosstalk prevention unit comprises a capacitor and a resistor respectively connected between the substrate and the ground.*

*20. The optical transceiver module of claim 15, further comprising:*

*a circuit unit that includes a detection circuit which reads a signal from the light receiver.*

*21. The optical transceiver module of claim 20, wherein the circuit unit includes, in association with an absorber, monitoring light emitted from the light source, and a current supplied to the light source is controlled through feedback by the controller.*

*22. The optical transceiver module of claim 15, wherein the crosstalk prevention unit comprises a capacitor and a transistor respectively connected between the substrate and the ground.*

*23. The optical transceiver module of claim 22, further comprising:*

*a circuit unit that includes a controller, in association with an absorber, monitoring light emitted from a light controller, wherein an on-off state of the transistor is controlled through the controller.*

*24. The optical transceiver module of claim 22, wherein the transistor is a MOS (metal oxide semiconductor) transistor and a resistor is placed between a gate of the MOS transistor and the ground.*

*25. The optical transceiver module of claim 22, further comprising:*

*a drive circuit that includes a differential pair circuit driving the light source, wherein the transistor is used as a current source of the differential pair circuit.*

*26. The optical transceiver module of claim 15, wherein the optical transceiver comprises an absorber between the light source and the light receiver.*

* * * * *